United States Patent
Ramkissoon et al.

(10) Patent No.: US 7,577,627 B2
(45) Date of Patent: Aug. 18, 2009

(54) MODULAR SQL RULE-BASED MANAGEMENT OF JOB PROCESS FLOW

(75) Inventors: Ravi Ramkissoon, Burlingame, CA (US); Raghu Mani, Sunnyvale, CA (US); Jacco Draaijer, Belmont, CA (US); Eric Voss, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 11/247,498

(22) Filed: Oct. 10, 2005

(65) Prior Publication Data

US 2007/0094186 A1    Apr. 26, 2007

(51) Int. Cl.
  *G06F 17/00*  (2006.01)
  *G06N 5/00*  (2006.01)
(52) U.S. Cl. ...................................... 706/45
(58) Field of Classification Search .......... 718/107, 718/102, 104; 706/45
  See application file for complete search history.

(56) References Cited

U.S. PATENT DOCUMENTS

| | | | |
|---|---|---|---|
| 6,317,823 B1* | 11/2001 | Wakai et al. | 712/220 |
| 6,988,102 B2* | 1/2006 | Rossiter et al. | 707/10 |
| 6,988,139 B1* | 1/2006 | Jervis et al. | 709/226 |
| 7,065,419 B2* | 6/2006 | Wu et al. | 700/97 |
| 2005/0022198 A1* | 1/2005 | Olapurath et al. | 718/102 |
| 2005/0223047 A1* | 10/2005 | Shah et al. | 707/201 |
| 2005/0234575 A1* | 10/2005 | Wu et al. | 700/97 |
| 2005/0251436 A1* | 11/2005 | Moffat et al. | 705/8 |
| 2006/0106846 A1* | 5/2006 | Schulz et al. | 707/101 |
| 2006/0107265 A1* | 5/2006 | Schulz et al. | 718/100 |
| 2006/0225075 A1* | 10/2006 | Mankovski et al. | 718/102 |

OTHER PUBLICATIONS

Daigle, John. "Task-Oriented Queueing: An Analysis Tool for Software Design of Communication Processing Systems" Mar. 1986, IEEE Transactions on Communications, vol. COM-34.*
"Queue". Microsoft Computer Dictionary, Fifth Edition. Microsoft Corporation. May 1, 2002.*

* cited by examiner

*Primary Examiner*—Joseph P Hirl
(74) *Attorney, Agent, or Firm*—Vista IP Law Group, LLP.

(57) ABSTRACT

A system, method, computer program and article of manufacture for improved process flow of job processing is accomplished via a combination of complex dependencies, task and chain reuse, and use of one or more events as a task.

47 Claims, 8 Drawing Sheets

MODULAR SQL RULE-BASED MANAGEMENT OF JOB PROCESS FLOW

BACKGROUND AND SUMMARY

Field of the Invention

This disclosure is directed to computer systems, and more particularly to job processing.

A job can be thought of as a combination of a task (i.e., what to do) and a schedule (i.e., when to do it). A job task can be any program inside or outside of a database, some examples include: shell scripts, executables, query language blocks, or stored procedures. Jobs are typically scheduled to run independent of each other. That is, each task is scheduled at a single time, or at a regular interval, or at the occurrence of a specific event. For example, an organization can schedule each maintenance task to be executed daily at midnight to minimize the effect those tasks may have on user response. However, tasks are often interrelated. To accommodate for interrelated tasks, a job can accommodate a group of tasks in a chain.

A chain is a combination of tasks that are related. Tasks are associated with placeholders in the chain called steps. The steps in the chain must be run in the specific order as configured in the chain. For example, FIG. 1A illustrates an embodiment of a serial chain 100. Chain 100 includes steps A 102, B 104, and C 106. Task 1 is associated with step A, task 2 is associated with step B, and task 3 is associated with step C. Steps A, B, and C must execute one after the other in chain 100. When a step is run, the task associated with the step is executed. Chain 120 in FIG. 1B is a parallel chain with steps A-D. Task 10 is associated with step A, task 20 is associated with step B, task 30 is associated with step C, and task 40 is associated with step D. Step A 122, branches out to both step B 124 and to step C 126. If A fails, perhaps B 124 is executed. If A 122 succeeds, perhaps C 126 is executed. Upon either B 124 or C 126 completing, step D 128 is executed.

The requirements governing the triggering of each step are called "dependencies". Each dependency is referred to as a rule. The dependency rules determine the processing of the chain by detailing how one step is dependent on another step i.e., the relationship between the steps. Each rule has two parts, a condition and an action. The condition describes the prerequisite for executing the action. The action determines what is done. For example, in chain 120, Dependency 130 governs the relationship between step A 122 and step B 124. The condition 132 of dependency 130 may be "if step A 122 fails", whereas the action 134 of dependency 130 may be "start step B 124". There is a dependency rule prior to each step in a chain, including the first step.

The interrelating of tasks using chains is helpful, however, the limitations of the current technology has drawbacks. For example, each task can only be assigned to one step in the chain, the task is limited to being a program, and dependency conditions are limited to simple Boolean statements. To overcome these drawbacks an improved job processing flow is needed.

A method of creating a processing job may include creating a chain where the chain is a group of interrelated tasks to be performed, associating the group of tasks with a plurality of steps where each step occupies a position in the chain and each task is capable of associating with multiple steps in one or more chains, creating a set of rules interrelating the steps where each rule includes a condition and an action where the condition describes a prerequisite for performing the action, and creating a job for the chain.

DETAILED DESCRIPTION OF INVENTION

Figure 1A:
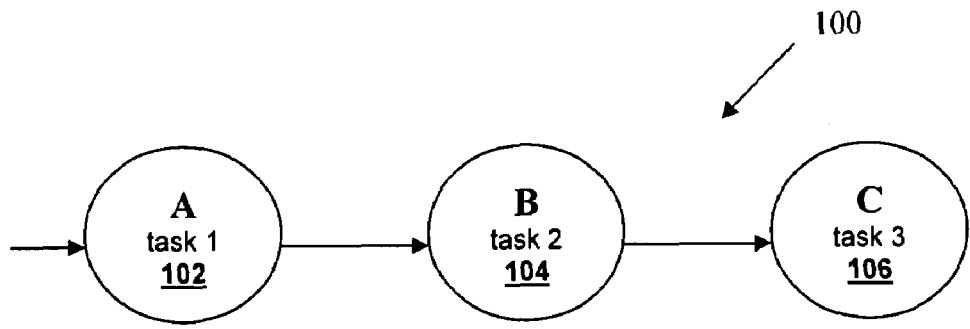
FIG. 1A is a representation of a chain.
Figure 1B:
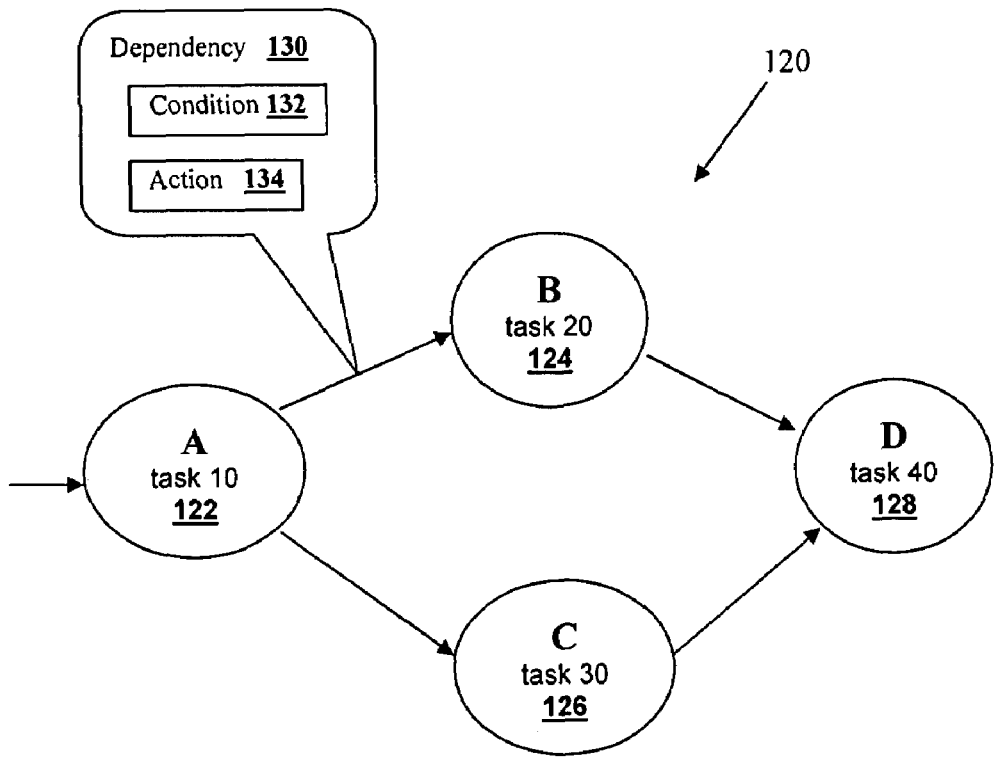
FIG. 1B is a representation of a chain.

Chain technology provides a mechanism to relate tasks. However, the current state of chain technology has several drawbacks including: each task can only be assigned to one step in the chain, each task is limited to being a program, and dependencies (conditions and actions) are limited to simple Boolean statements. An improved method of job process flow is presented herein to overcome these drawbacks.

The improved process flow is accomplished via a combination of several improvements including complex dependencies, task and chain reuse, and use of events as a task. These improvements are described below.

Complex Dependencies

Recall that dependencies detail the relationship between steps and include a condition that determines the prerequisite for performing an action. Typical conditions include a Boolean statement indicating that the completion of the previous step is the trigger for the succeeding step. In contrast, in some embodiments herein conditions can include complex Boolean statements involving time, a plurality of step states and step attributes, SQL statements, and/or events.

In some embodiments, the condition may include a plurality of step states, to provide a more precise dependency rule. For example, a dependency rule condition in one embodiment may include "if step A succeeds and step B fails and step C is stopped or is in error, then run step D".

In some embodiments, the condition of the dependency rule may include a plurality of step attributes, or a combination of step states and step attributes. An example condition including a combination is "if step A succeeded and step B has a run duration of greater than 30 minutes, then stop step C".

In another embodiment, the condition of the dependency rules can include a SQL statement. As the job scheduler is contained in a database environment, the job scheduler has access to any data in the database. As such, the condition can include any extensions to the SQL standard that are supported in the database. In addition, the SQL statements can refer to any state or attribute of any other step in the chain, and can refer to any other data existing within the database. SQL-based rules can be used to filter specific events that a chain is interested in to provide an extra degree of control. An example dependency rule using SQL may be "if quantity of bolt456 in inventory_tb1 is less than 1000, then start step G" where step G includes a task that initiates on-line ordering of bolt456.

With the ability to use complex conditions to trigger an action, the dependency rules may need to be evaluated periodically to check for conditions that newly become satisfied. To accommodate this need, a chain can have an evaluation interval configured. At the set evaluation interval for the chain, the rules are evaluated, in addition to the rules being evaluated at the end of each step.

In yet another embodiment, the dependency condition may also specify an event. Within the database enqueuing a message into a queue can be an event. The producers of the event may have no knowledge that the consumers of the event are waiting, that is, the production of the event and the consumption of the event are separate operations. In fact, the database standard message queuing mechanism is used for event based conditions. Several steps can depend on the same event. An example condition and action using an event may be "If message "last_day_of_employment" is received, then START step D." In this example, some other application sends an event when an employee's final day of employment is reached. When the event is received, step D is run. Step D may be a clean up task to delete that person from employee email groups, security permission groups etc. For further information regarding step states, see co-pending application Ser. No. 11/247,500 entitled Leveraging Advanced Queues to Implement Event Based Job Scheduling filed on even date herewith, which is incorporated by reference in its entirety.

Chains—Master Job

Figure 2:
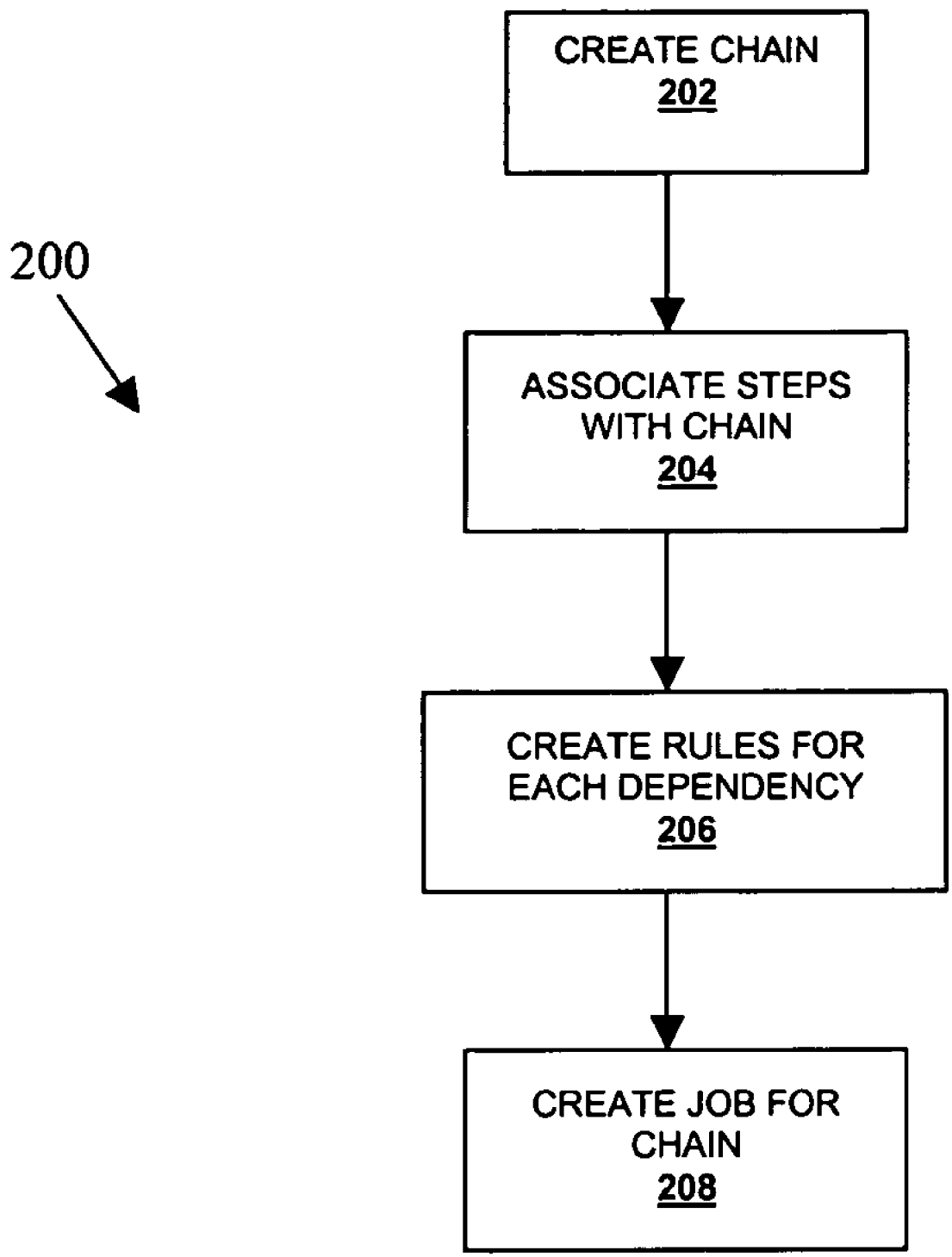
FIG. 2 is a representation of process 200, management of job process flow.

Each chain is associated with a master job. The master job is simply the job created to run the chain. The process to create a master job, process 200, is shown in FIG. 2. A chain object is created in process action 202. Steps and their related tasks are associated with the chain in process action 204. The dependencies are created in process action 206. The master job is created for the chain in process action 208. This master job is scheduled just like all other jobs. The schedule may be time and date based or event based.

Each executing instance of a chain tracks and stores the state and attributes of each of the steps in the chain metadata. Example step states include: running, completed, not started, succeeded, failed, stopped, paused, and scheduled. Running indicates that the step is active. Not started indicates that the step is waiting to be activated. Completed indicates that the step has finished executing. Succeeded indicates that the step finished executing without errors or being forced to stop. Stopped indicates that the step was forced to stop operation. Paused indicates that the step has had a momentary stoppage of operation but will resume. Scheduled indicates that the step is scheduled to become active in the future.

Example step attributes include: start time, start date, step state, completion date, completion time, step error, run duration. Start time is the time stamp at which the step began executing. Start date is the date at which the step began executing. Completion time is the time stamp at which the step stopped executing. Completion date is the date at which the step stopped executing. Step state is the current state of the step. Step error is the error code of any errors the step experiences during operation. Run duration is the length of time the step has been executing.

The chain is a modular unit. That is, it is possible to have more than one instance of a chain executing either simultaneously or on different schedules.

Task Reuse

Recall that each step in a chain has a task associated with it. In some embodiments, the task can be a self-contained action. In other embodiments, the task can be another chain. The task (what to do) and the step (when or at which position in the chain) in the embodiments herein are considered separate entities. As such, it is possible to reuse the same task at multiple positions within the chain. In some embodiments, nesting chains is also provided by allowing a task to be another chain.

Step Events

In addition to the condition of a dependency and the master job condition being an event, the step task itself can also be an event. This allows a chain to wait for an event before proceeding. As soon as the event occurs, the step associated with the event completes and the chain continues. This is done without having to periodically check for the event. For further information regarding step states, see co-pending application Ser. No. 11/247,500 entitled Leveraging Advanced Queues to Implement Event Based Job Scheduling filed on even date herewith.

Figure 3:
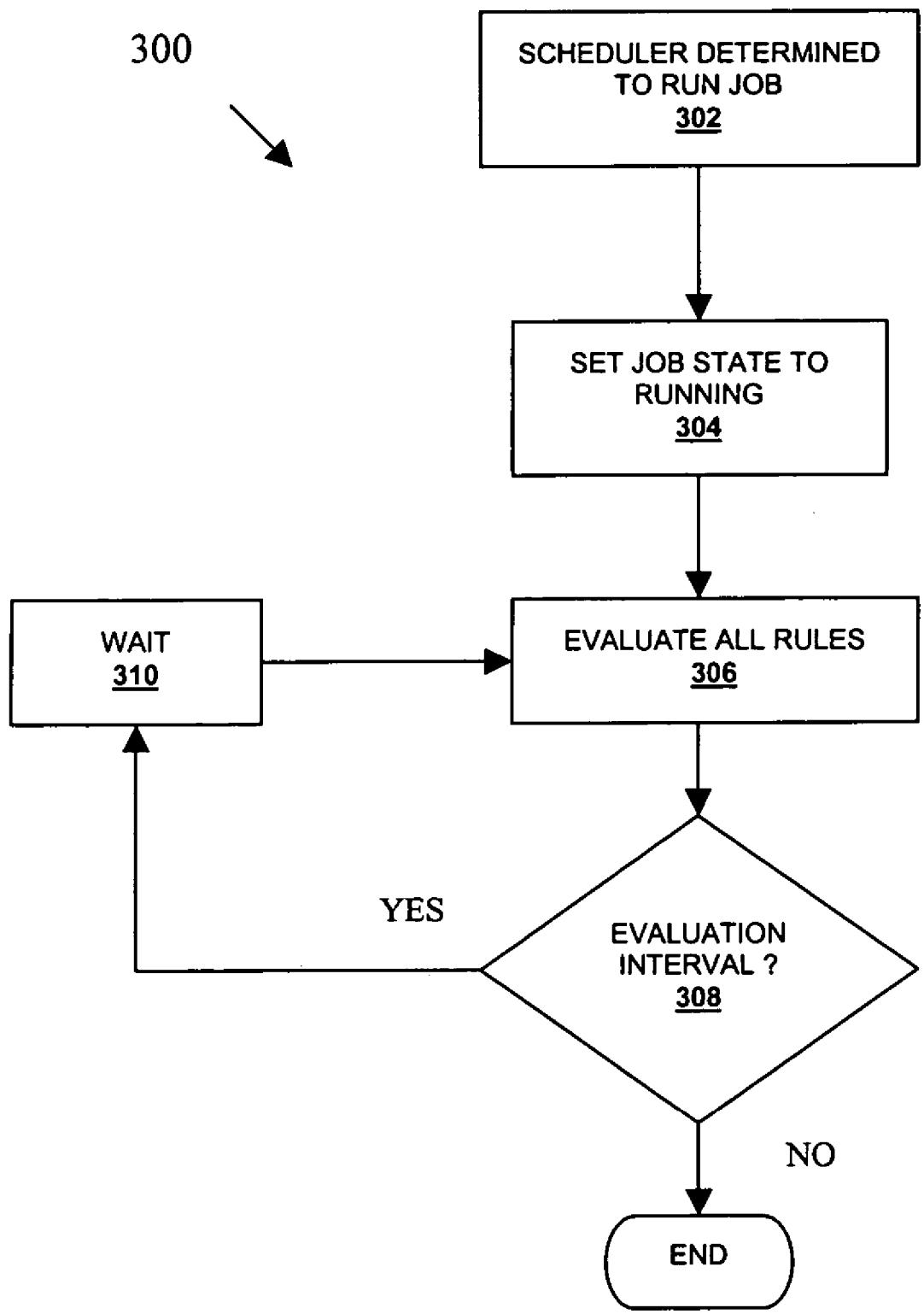
FIG. 3 is a representation of process 300, chain processing.
Figure 4:
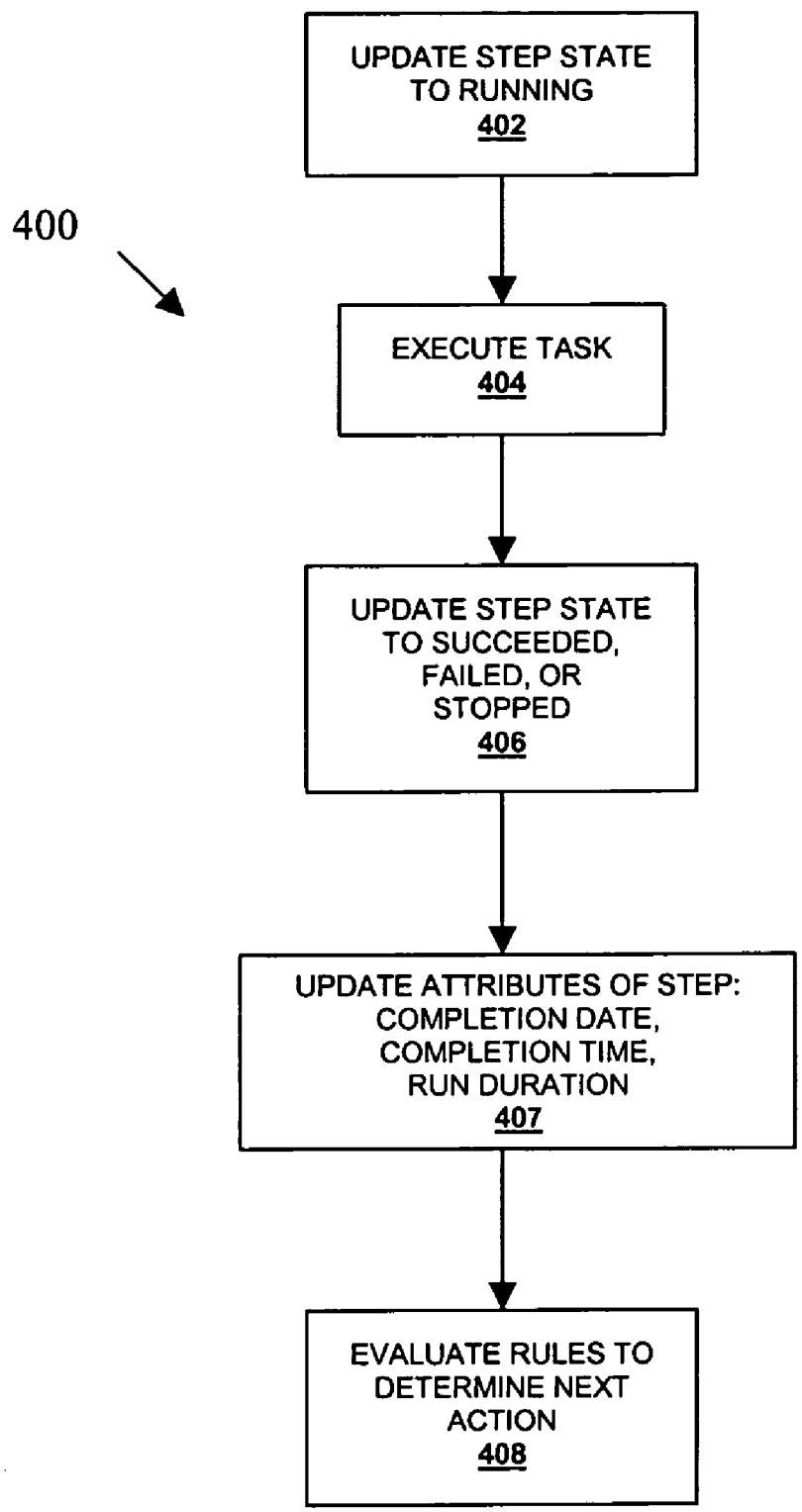
FIG. 4 is a representation of process 400, step processing.

An embodiment of chain processing is shown by process 300 in FIG. 3. In process action 302, the scheduler determined to run the master job. Process action 304 set the job state of the master job to "running". Process 306 evaluates all the dependency rules to determine which steps are to be executed. Process action 308 determines if an evaluation interval has been configured. If an evaluation interval has not been configured, process 300 ends. If an evaluation interval has been configured, process 310 waits for the configured interval amount of time, this returns process 300 to process action 306, which evaluates all the rules.

During process 300, it is determined which and when steps are evaluated. Process 400 is an illustration of an embodiment of step processing. In process action 403, the state of the step is updated to "running". In process action 404 the task associated with the step is executed. The task, as mentioned previously, may be a program or an event. Process action 406 updates the state of the step. The step state can be "succeeded", "failed", or "stopped". Process action 407 updates the other attributes of the step including completion date, completion time, and run duration. In process action 408 the dependency rules are evaluated to determine the next action, or where the chain proceeds next.

Figure 5:
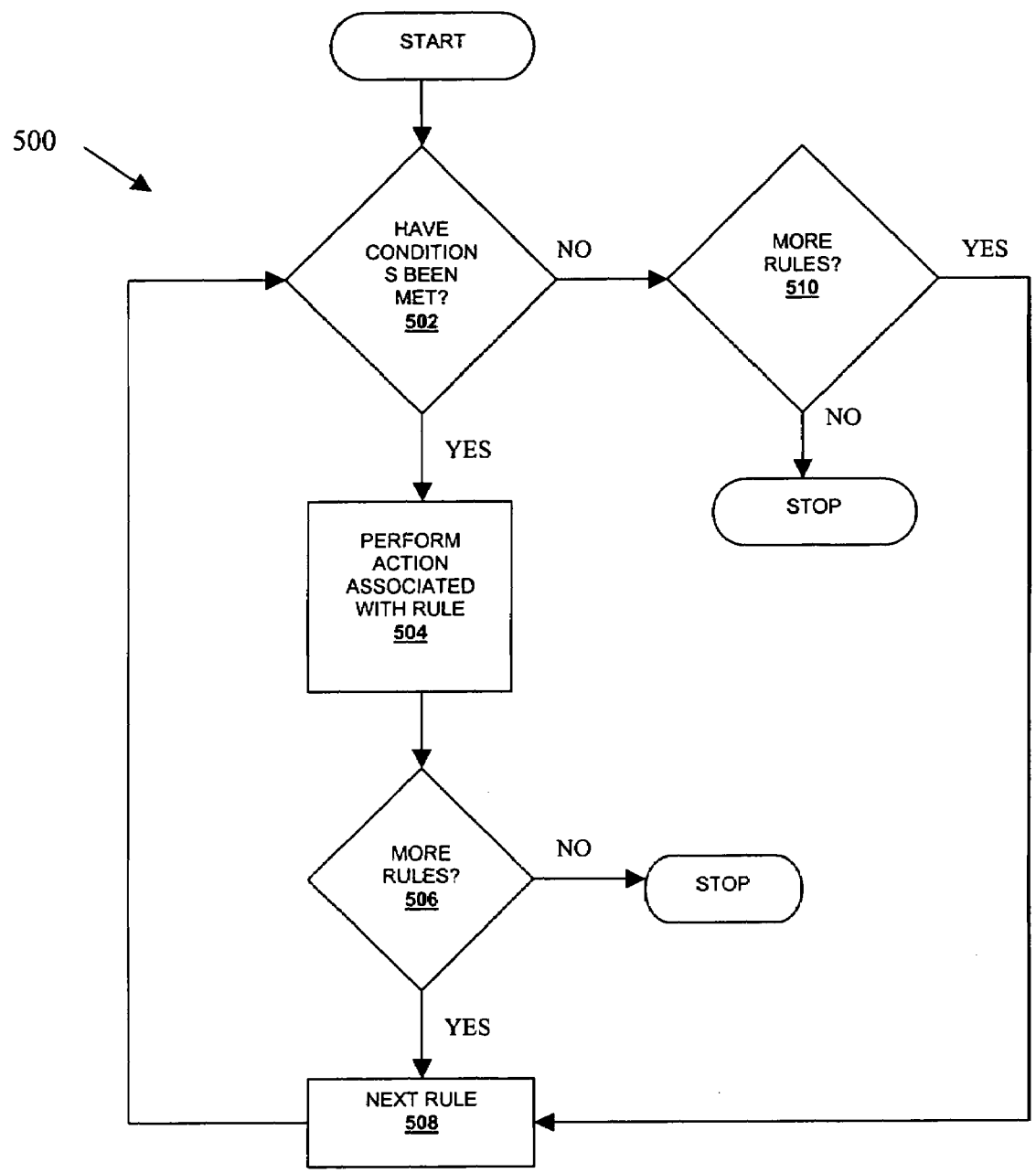
FIG. 5 is a representation of process 500, the evaluate rules process.

An embodiment of process 500, the evaluate dependency rules process, is shown in FIG. 5. This process starts in process action 502 by determining if the condition of the first rule has been met. If the condition has been met, the action associated with the condition is performed in process action 504. Some example actions include to start a step, end a step, or end the job. Process action 506 determines if there are more rules in the chain. If there are no more rules, process 500 stops. If there are more rules, process 500 selects the next rule in process action 508 and returns to process action 502 to determine if the conditions have been met. If the conditions have not been met in process action 502, process action 510 determines if there are more rules. If not, process 500 stops. If there are more rules, process 500 goes to process action 510 to select the next rules. Process 500 then returns to process action 502 to test the conditions.

Figure 6:
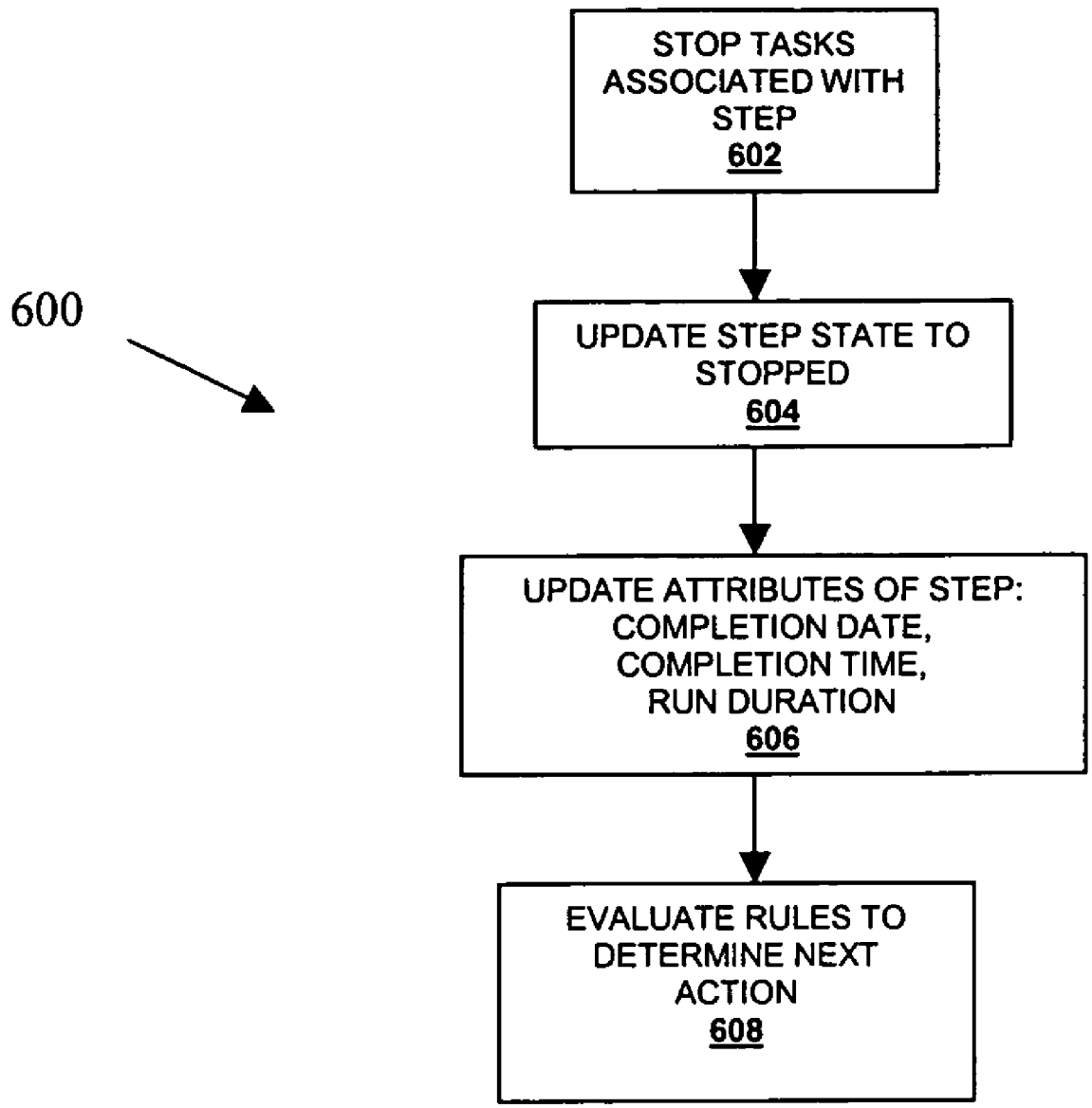
FIG. 6 is a representation of process 600, the stop step process.

Recall, the tasks associated with a step can end another step or end a job. FIG. 6 details the stopping a step process, process 600. In process action 602 the tasks associated with the step are stopped. The state of the step is updated to "stopped" in process action 604. The attributes of the step including completion time, completion date and run duration are updated in process action 606. In process action 608 the dependency rules are evaluated to determine the next action, or where the chain proceeds next.

Figure 7:
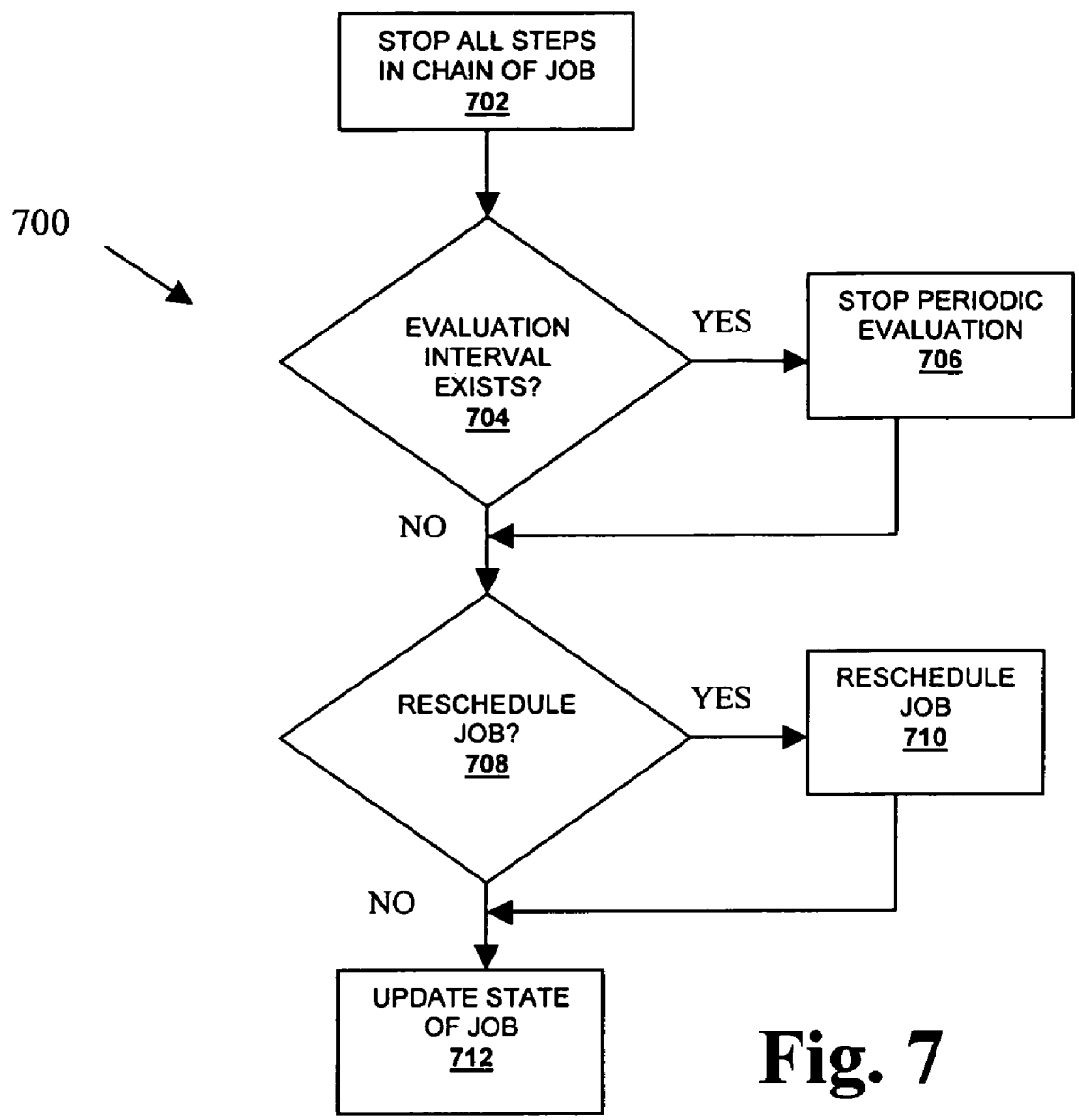
FIG. 7 is a representation of process 700, the end job process.
Figure 8:
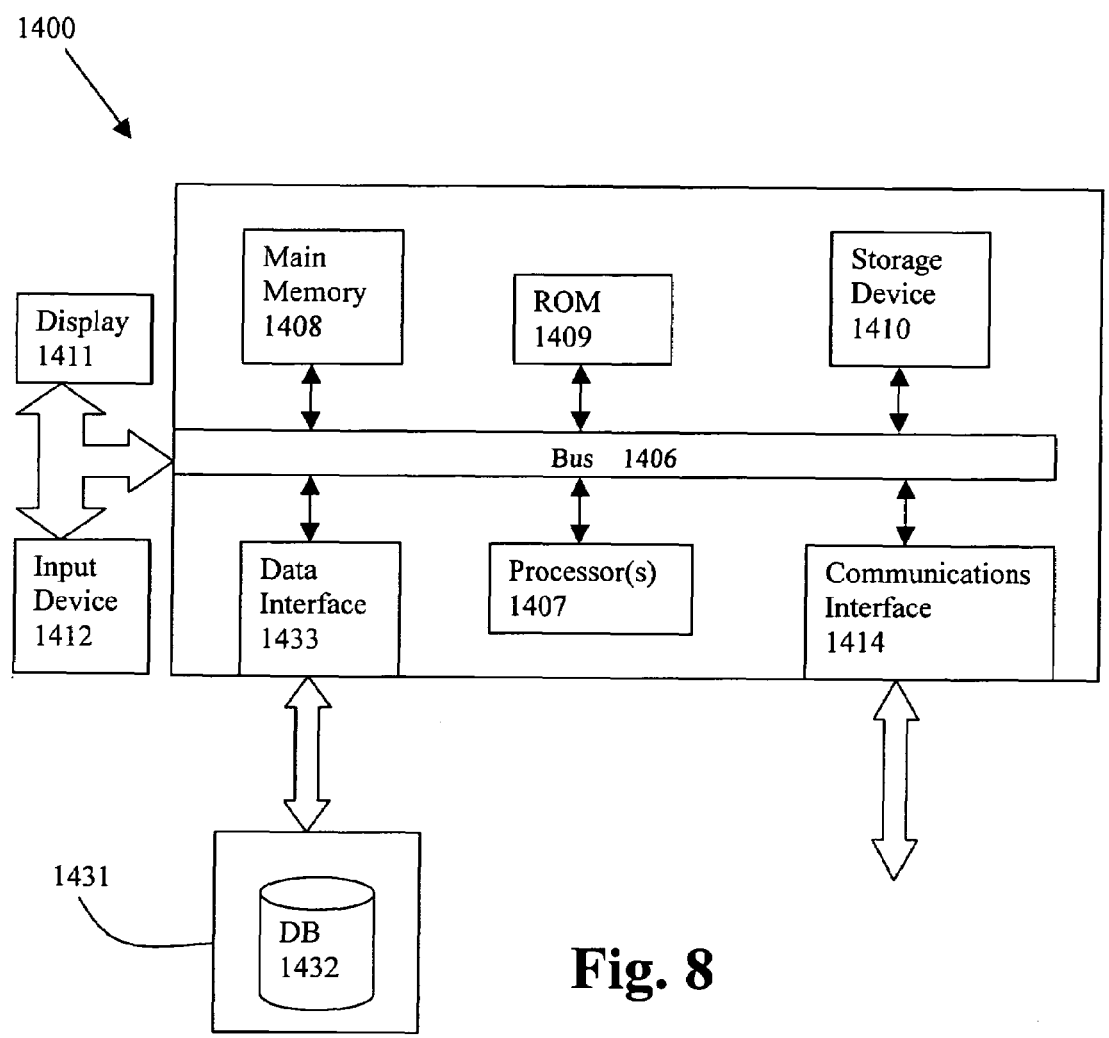
FIG. 8 is a representation of a system that can provide modular SQL rule-based management of job process flow.

Process 700, the ending a job process, is illustrated in FIG. 7. Process action 702 stops all steps in the chain of the job. Process action 704 determines if an evaluation interval has been configured for the chain. Recall, that since a chain may have complex SQL-based conditions, the chain also may have an evaluation interval to trigger periodic evaluation of the rules. If there is an evaluation interval, process action 706 stops the periodic evaluation of the rules. If there is no evaluation interval or after the periodic evaluation is stopped, process action 708 determines if the job should be rescheduled. If the job should be rescheduled, process action 710 reschedules the job. If the job is not to be rescheduled, or after the job is rescheduled, process action 712 updates the state of the job to "complete". Rescheduling depends on the schedule that has been specified for the master job. For example, a schedule may be required to run the job once a day, once a month, just once for all time or just three times.

There are situations when a database or database or job instance goes down unexpectedly while a chain is running. Processing is resumed from precisely where the processing stopped via a recovery process. The recovery process evaluates the dependency rules for all chains that were running to determine whether any actions need to be performed and resumes any tasks that should be resumed.

System Architecture Overview

The execution of the sequences of instructions required to practice the invention may be performed in embodiments of the invention by a computer system 1400 as shown in FIG. 9. In an embodiment of the invention, execution of the sequences of instructions required to practice the invention is performed by a single computer system 1400. According to other embodiments of the invention, two or more computer systems 1400 coupled by a communication link 1415 may perform the sequence of instructions required to practice the invention in coordination with one another. In order to avoid needlessly obscuring the invention, a description of only one computer system 1400 will be presented below; however, it should be understood that any number of computer systems 1400 may be employed to practice the invention.

A computer system 1400 according to an embodiment of the invention will now be described with reference to FIG. 9, which is a block diagram of the functional components of a computer system 1400 according to an embodiment of the invention. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem.

A computer system 1400 may transmit and receive messages, data, and instructions, including program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments of the invention, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment of the invention, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1407. Such a medium may take many forms, including, but not limited to, non-volatile and volatile. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

We claim:

1. A computer implemented method of creating a processing job, the method comprising:

creating a chain, the chain comprising a group of interrelated tasks to be performed;

associating the chain with a plurality of steps, each of the steps occupying a position in the chain, the steps being different entities from the tasks, at least one of the interrelated tasks being reusable and being assigned to each of at least two of the steps in the chain or a second chain, wherein the second chain comprises a second group of interrelated tasks to be performed;

creating a set of rules for the chain to interrelate an order of execution of the steps, each rule comprising a condition and an action, the condition describing a prerequisite for performing the action, wherein at least one of the set of rules comprises a complex dependency using a database query language statement, wherein the complex dependency is evaluated periodically at a plurality of intervals to determine whether the condition becomes satisfied;

creating a job, using a processor, for processing the chain according to the order of execution; and storing the job for processing the chain in a tangible machine readable medium.

2. The method of claim 1, wherein the chain has metadata, the metadata comprising a state of each of the plurality of steps.

3. The method of claim 1, wherein one or more of the tasks includes an event.

4. The method of claim 1, wherein the condition includes SQL statements.

5. The method of claim 4, wherein the SQL statements utilize data available in the database.

6. The method of claim 1, wherein the condition includes an event.

7. The method of claim 1, wherein the condition includes one or more states of one or more of the plurality of steps.

8. The method of claim 1, wherein one or more tasks includes a second chain.

9. The method of claim 1, wherein the steps are positioned in parallel.

10. The method of claim 1, wherein the condition includes one or more attributes of one or more of the plurality of steps.

11. The method of claim 1, wherein the tasks prescribe actions to be performed, and the steps prescribe locations in the chain for performing the actions.

12. A computer program product embodied on computer readable medium, the computer readable medium having stored thereon a sequence of instructions which, when executed by a processor, causes the processor to execute a method for creating a processing job, the method comprising:

creating a chain, the chain being a group of interrelated tasks to be performed;

associating the chain with a plurality of steps, each of the steps occupying a position in the chain, the steps being different entities from the tasks, at least one of the interrelated tasks within the group being reusable and being assigned to each of at least two of the steps in the chain or a second chain, wherein the second chain comprises a second group of interrelated tasks to be performed;

creating a set of rules interrelating an order of execution of the steps, each rule comprising a condition and an action, the condition describing a prerequisite for performing the action, wherein at least one of the set of rules comprises a complex dependency using a database query language statement, wherein the complex dependency is evaluated periodically at a plurality of intervals to determine whether the condition becomes satisfied;

creating a job, using a processor, for processing the chain; and storing the job for processing the chain in a tangible machine-readable medium.

13. The computer program product of claim 12, wherein the chain has metadata, the metadata comprising a state of each of the plurality of steps.

14. The computer program product of claim 12, wherein one or more of the tasks includes an event.

15. The computer program product of claim 12, wherein the condition includes SQL statements.

16. The computer program product of claim 12, wherein the condition includes an event.

17. The computer program product of claim 12, wherein the condition includes one or more states of one or more of the plurality of steps.

18. The computer program product of claim 12, wherein one or more tasks includes a second chain.

19. The computer program product of claim 12, wherein the condition includes one or more attributes of one or more of the plurality of steps.

20. The computer program product of claim 12, wherein the tasks prescribe actions to be performed, and the steps prescribe locations in the chain for performing the actions.

21. A system for creating a processing job, the system comprising:

a chain creator module configured to create a chain, the chain being a group of interrelated tasks to be performed;

an associating module configured to associate the group of tasks with a plurality of steps, each of the steps occupying a position in the chain, at least one of the interrelated tasks in the group being reusable and being assigned to each of at least two of the steps in the chain or in a second chain, wherein the second chain comprises a second group of interrelated tasks to be performed;

a rule creator module, configured to create a set of rules for the chain to interrelate an order of execution of the plurality of steps, each rule comprising a condition and an action, the condition describing a prerequisite for performing the action, wherein at least one of the set of rules comprises a complex dependency using an database query language statement, wherein the complex dependency is evaluated periodically at a plurality of intervals to determine whether the condition becomes satisfied;

a job creator module, configured to create a job for processing the chain; and storing the job for processing the chain in a tangible machine-readable medium for subsequent processing by a processing unit of the computer.

22. The system of claim 21, wherein one or more of the tasks includes an event.

23. The system of claim 21, wherein the condition includes SQL statements.

24. The system of claim 21, wherein the condition includes an event.

25. The system of claim 21, wherein the condition includes one or more states of one or more of the plurality of steps.

26. The system of claim 21, wherein the tasks prescribe actions to be performed, and the steps prescribe locations in the chain for performing the actions.

27. A computer implemented method of managing job process flow, the method comprising:

creating a job for processing a chain, in which the chain comprises a plurality of interrelated tasks to be performed, steps and rules, the tasks being different entities from the steps, wherein at least one of the plurality of interrelated tasks is assigned to each of at least two of the steps in the chain or a second chain comprising a second group of interrelated tasks to be performed, the rules causing the plurality of tasks to be interrelated;

evaluating one of the rules, using a processor, after one of the steps and periodically at a preset temporal evaluation interval, in which the one of the rules comprises a complex dependency using an database query language statement, wherein the one of the rules comprises a condition and an action, the condition describes a prerequisite for performing the action, and the complex dependency is evaluated at the preset temporal evaluation interval to determine whether the condition becomes satisfied; and storing a result of the act of evaluating the one of the rules on a tangible machine readable medium.

28. The method of claim 27, wherein the act of evaluating the one of the rules comprises:

(a) determining if the condition for the one of the rules has been met;

(b) if the condition for the one of the rules has been met, performing the action; and (c) repeating (a) and (b) if it is determined that there are more rules.

29. The method of claim 28, wherein the act of performing the action comprises:

updating a state of the step to running;

executing the task associated with the step; and updating the state of the step to reflect execution status.

30. The method of claim 28, wherein the act of performing the action comprises stopping a step or ending a job.

31. The method of claim 30, wherein the act of stopping the step comprises:

stopping the tasks associated with the step;

updating a state of the step to stopped;

updating and end date, time, and run duration of the step.

32. The method of claim 30, wherein the act of ending the job comprises:

stopping all running steps;

stopping the periodic evaluation of the rules if it is determining that there is an evaluation interval;

rescheduling the job if it is determined that the job is to be rescheduled; and updating a state of the job.

33. The method of claim 27, wherein the tasks prescribe actions to be performed, and the steps prescribe locations in the chain for performing the actions.

34. A computer program product embodied on computer readable medium, the computer readable medium having stored thereon a sequence of instructions which, when executed by a processor, causes the processor to execute a method of managing job process flow, the method comprising:

creating a job for processing a chain, in which the chain comprises a plurality of interrelated tasks to be performed, steps and rules, the tasks being different entities from the steps, wherein at least one of the plurality of interrelated tasks is assigned to each of at least two of the steps in the chain or a second chain comprising a second group of interrelated tasks to be performed, the rules causing the plurality of tasks to be interrelated;

evaluating one of the rules, using a processor, after one of the steps and periodically at a preset temporal evaluation interval, in which the one of the rules comprises a complex dependency using an database query language statement, wherein the one of the rules comprises a condition and an action the condition describes a prerequisite for performing the action, and the complex dependency is evaluated at the preset temporal evaluation interval to determine whether the condition becomes satisfied; and storing a result of the act of evaluating the one of the rules on a tangible machine readable medium.

35. The computer program product of claim 34, wherein the step of evaluating the one of the rules of the process further comprises:

(a) determining if the condition for one of the rules has been met;

(b) if the condition for the one of the rules has been met, performing the action; and (c) repeating (a) and (b) if it is determined that there are more rules.

36. The computer program product of claim 35, wherein the step of performing the action of the process comprises:

updating a state of the step to running;

executing the task associated with the step; and updating the state of the step to reflect execution status.

37. The computer program product of claim 35, wherein the step of performing the action comprises stopping a step or means for ending a job.

38. The computer program product of claim 37, wherein the step of stopping the step of the process comprises:

stopping the tasks associated with the step;

updating a state of the step to stopped;

updating an end date, time, and run duration of the step; and evaluating the rule set.

39. The computer program product of claim 37, wherein the step of ending the job of the process comprises:

stopping all running steps;

stopping the periodic evaluation of the rules if it is determining that there is an evaluation interval;

rescheduling the job if it is determined that the job is to be rescheduled; and updating a state of the job.

40. The computer program product of claim 34, wherein the tasks prescribe actions to be performed, and the steps prescribe locations in the chain for performing the actions.

41. A system for managing job process flow, comprising:

creating a job for processing a chain, in which the chain comprises a plurality of interrelated tasks to be performed, steps and rules, the tasks being different entities from the steps, wherein at least one of the plurality of interrelated tasks is assigned to each of at least two of the steps in the chain or in a second chain comprising a second group of interrelated tasks to be performed, the rules causing the plurality of tasks to be interrelated;

evaluating one of the rules after one of the steps and periodically at a preset evaluation interval, in which the one of the rules comprises a complex dependency using an database query language statement, wherein the one of the rules comprises a condition and an action, the condition describes a prerequisite for performing the action, and the complex dependency is evaluated at the preset temporal evaluation interval to determine whether the condition becomes satisfied; and storing a result of the act of evaluating the one of the rules on a tangible machine readable medium.

42. The system of claim 41, wherein the means for evaluating the one of the rules further comprises:

(a) means for determining if the condition for the one of the rules has been met;

(b) means for if the condition for the one of the rules has been met, performing the action; and (c) means for repeating (a) and (b) if it is determined that there are more rules.

43. The system of claim 42, wherein the means for performing the action comprises:

means for updating a state of the step to running;

means for executing the task associated with the step; and means for updating the state of the step to reflect execution status.

44. The system of claim 42, wherein the means for performing the action comprises means for stopping a step or means for ending a job.

45. The system of claim 44, wherein the means for stopping the step comprises:

means for stopping the tasks associated with the step;

means for updating a state of the step to stopped;

means for updating an end date, time, and run duration of the step.

46. The system of claim 44, wherein the means for ending the job comprises:

means for stopping all running steps;

means for stopping the periodic evaluation of the rules if it is determining that there is an evaluation interval;

means for rescheduling the job if it is determined that the job is to be rescheduled; and means for updating a state of the job.

47. The system of claim 41, wherein the tasks prescribe actions to be performed, and the steps prescribe locations in the chain for performing the actions.

* * * * *

UNITED STATES PATENT AND TRADEMARK OFFICE
CERTIFICATE OF CORRECTION

| | | |
|---|---|---|
| PATENT NO. | : 7,577,627 B2 | Page 1 of 1 |
| APPLICATION NO. | : 11/247498 | |
| DATED | : August 18, 2009 | |
| INVENTOR(S) | : Ravi Ramkissoon et al. | |

It is certified that error appears in the above-identified patent and that said Letters Patent is hereby corrected as shown below:

In column 7, lines 25-27, in Claim 1, delete "storing the job for processing the chain in a tangible machine readable medium." and insert the same on Col. 7, Claim 1, Line 26, with a new tab.

In column 8, lines 54-56, in Claim 21, delete "storing the job for processing the chain in a tangible machine-readable medium for subsequent processing by a processing unit of the computer." and insert -- a tangible machine-readable medium for storing the job for subsequent processing by a processing unit of the computer. --, therefor.

Signed and Sealed this

Twenty-seventh Day of July, 2010

David J. Kappos
*Director of the United States Patent and Trademark Office*